J. JENSEN.
AIR RESISTANCE MEASURING GAGE FOR AUTOMOBILES AND SIMILAR VEHICLES.
APPLICATION FILED JAN. 13, 1915.

1,162,366.

Patented Nov. 30, 1915.

WITNESSES:
H. Hogg.

INVENTOR
Jens Jensen
BY Carl P. Goepel
ATTORNEY

COLUMBIA PLANOGRAPH CO., WASHINGTON, D. C.

UNITED STATES PATENT OFFICE.

JENS JENSEN, OF KOLDING, DENMARK.

AIR-RESISTANCE-MEASURING GAGE FOR AUTOMOBILES AND SIMILAR VEHICLES.

1,162,366.  Specification of Letters Patent.  Patented Nov. 30, 1915.

Application filed January 13, 1915. Serial No. 1,980.

*To all whom it may concern:*

Be it known that I, JENS JENSEN, a citizen of the Kingdom of Denmark, residing at Kolding, in the Province of Jutland, Kingdom of Denmark, have invented certain new and useful Improvements in Air-Resistance-Measuring Gages for Automobiles and Similar Vehicles, of which the following is a specification.

The wind is of great significance to modern vehicles, especially automobiles, its varying resistance often causing the driver much trouble. When such a vehicle, while advancing rapidly, suddenly meets a strong contrary wind, the resistance is increased, causing the automobile to slow down, and not until then does the driver notice the increased resistance, and he is obliged to increase the driving capacity of the engine in order to counteract the extra resistance. If, however, the driver were always properly informed with respect to the existing resistance, the speed of the automobile might be kept uniform. The present invention remedies this deficiency.

The invention consists of an air-resistance measuring gage disposed on the front part of the automobile, generally on the metal plug or cover of the cooling jacket, its dial facing the driver. The pointer on the dial shows the resistance to which the automobile is subjected during the drive.

Figure 1:
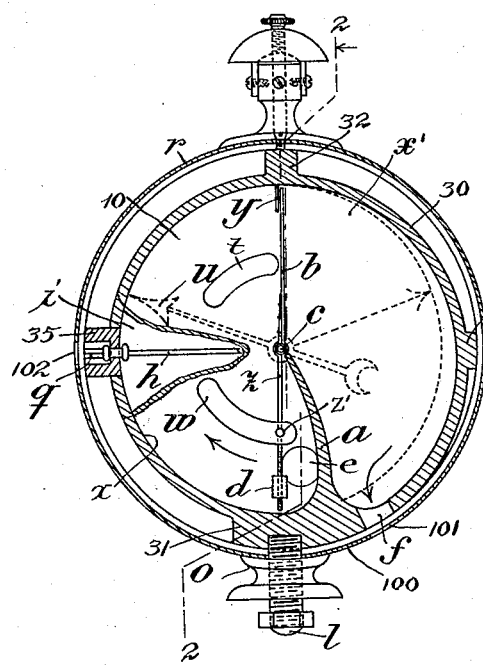
Figure 2:
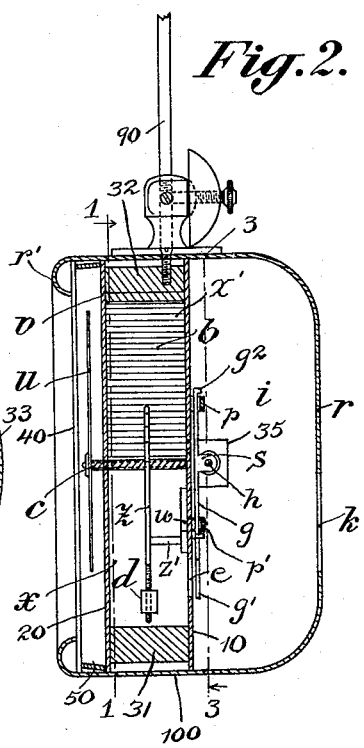
Figure 3:
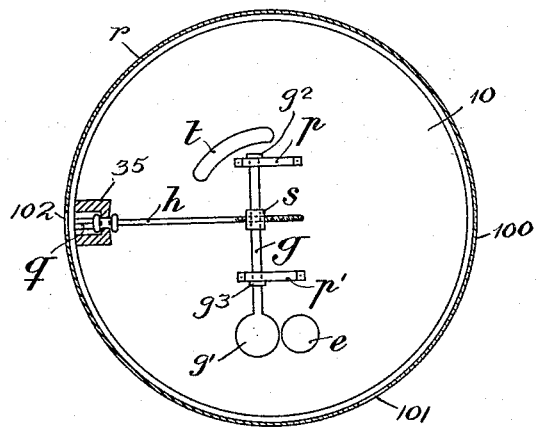

In the accompanying drawings, which show the preferred embodiment of this invention, Figure 1 represents a vertical transverse or circumferential section of the gage on line 1—1 of Fig. 2 looking toward the right, a part of the rear wall of the inner casing being broken out to facilitate illustration. Fig. 2 represents a vertical longitudinal or diametrical section thereof, on line 2—2 of Fig. 1. Fig. 3 represents a vertical transverse or circumferential section on line 3—3 of Fig. 2.

The same reference characters indicate corresponding parts in the different figures.

The gage herein illustrated as an example of the invention comprises an outer cylindrical casing 100, an inner eccentric casing 30 and a pressure indicating mechanism actuated by a current of air passing through said casings.

The outer cylindrical casing 100 has a closed front plate $r$, which may be integral with its cylindrical portion and an inward circumferential flange $r'$ at its rear end. This casing is provided in its front plate $r$ with an inlet opening $k$ exposed to the wind in the movement of the automobile for the entrance of air and on its periphery with an outlet opening 101 for the escape of the air which has passed through the gage and actuated the indicating mechanism.

The eccentric cylinder 30 is a short cylinder set within the casing 100 some distance from the front thereof forming an antechamber $i$. The front end of the inner casing is closed by a circular plate or head 10 and the rear end thereof by a circular plate 20, these plates preferably fitting closely within the cylinder 100. The plate 20 may serve as a dial. A glass plate 40 is disposed within the casing 100 against the flange $r'$ and a spacing ring 50 is disposed between said glass plate and the dial plate 20. The plates 10 and 20 are provided at their centers with bearings for an arbor $c$. The eccentric cylinder 30 is provided in its head 10 with a lower inlet opening $e$ preferably circular in form, and with an upper inlet opening $t$ preferably arc-shaped in form, which openings permit the entrance of air from the antechamber $i$ into the interior of the eccentric cylinder on one side of its movable partition hereinafter described and with an outlet opening $f$ on the other side of said movable partition in position to register or communicate with the exit opening 101 of the casing 100. The eccentric cylinder is provided with an approximately radial stationary partition $a$ which extends inward from the periphery at a point adjacent to the outlet opening $f$ to about the center of said cylinder. A radial movable partition $b$ extends from the inner end of said stationary partition $a$ to the periphery of the eccentric cylinder and in normal zero position of the indicator divides the interior of the eccentric cylinder into a primary chamber $x$ and a secondary chamber $x'$. This movable partition $b$ is preferably a swinging partition pivoted at its inner end at the inner end of the stationary partition $a$. An inward projection $y$ at the top of the eccentric cylinder serves as a stop to hold the swinging partition $b$ in normal position. A balance rod $z$ is attached to the arbor $c$ and projects downward opposite the movable partition $b$. This rod carries at its lower end an adjustable weight $d$ which counterbalances the partition $b$ and tends to hold said partition in its normal position against the stop $y$. The adjustment of the weight $d$ by means of screwthreads or otherwise higher or lower on the rod $z$ regulates the resistance of the partition $b$ to the air passing through the gage. As the partition $b$ swings on its pivot the outer edge thereof moves in the arc of a circle indicated by the dotted line in Fig. 1. After said partition $b$ swings away from its stop $y$ a space is formed between the outer edge of said partition and the inner periphery of the eccentric cylinder 30, which space gradually increases according to the degree of swing of the partition, the space increasing in width according to the eccentricity of the cylinder from a point near the stop $y$ to the exit opening $f$, as indicated by said arc-shaped dotted line.

The eccentric cylinder 30 is provided on its lower side with an arc-shaped attaching lug 31 and on its upper side with an attaching lug 32. These lugs are provided with screwthreaded sockets for the attachment of other parts as hereinafter described. The eccentric cylinder is also provided at one side with a lug 33 and at the opposite side with a key socket 35. The arbor $c$ carries a pointer $u$ which oscillates between the dial 20 and the glass plate 40 and serves as an indicator of the wind pressure.

The gage is preferably provided with means for regulating the passage of air therethrough. The regulator herein shown consists of a damper mechanism for closing or partially closing the opening $e$ which permits the passage of air from the antechamber $i$ to the eccentric cylinder 30. The head 10 of the eccentric cylinder is provided with horizontal keepers or guides $p$ and $p'$ and the slide rod $g$ having lugs $g^2$ and $g^3$ is movable in said keepers. This rod $g$ is provided at its lower end with a disk $g'$ which moves over the outer face $e$ of the plate 10 and closes more or less the opening $e$ therein according to the position of the rod $g$ in its keepers $p$. The shifting of the disk $g'$ to regulate the size of the opening $e$ is accomplished by a screw rod $h$ which engages at its inner end a nut $s$ on the rod $g$ and at its outer end the socket 35. This adjusting rod $h$ has a square key post $q$ within said socket. This key post is reached by a turning key through an opening 102 in the outer casing 100. The gage is also preferably provided with an automatic pressure releasing device which performs the function of a brake to retard or arrest the movement of said partition when it reaches the limit of its outward swing. This brake in the example illustrated comprises an arc-shaped plate $w$ attached by means of a post $z'$ or otherwise to the balance rod $z$ and adapted in the downward swing of the partition $b$ to move over and close or partially close the arc-shaped slot $t$ as the partition reaches the lower end of its swing. This closing of the slot $t$ prevents the entrance of air therethrough to the eccentric cylinder and thus reduces the pressure on said partition, when the latter is at or near the end of its stroke or swing.

The apparatus may be provided at its bottom with a supporting foot $o$ or as shown in Fig. 1 at its top with a suspension means 90, as shown in Fig. 2. A clamping screw $l$ may pass through the foot $o$ and take into the threaded socket of the lug 31.

In the use of this gage it is placed in position in front of the automobile and the wind enters through the exposed inlet $k$ into the antechamber $i$ and thence passes through the inner inlets $e$ and $t$ into the primary chamber $x$, creating an air pressure therein. This pressure is exerted against the movable partition $b$ and swings the latter downward more or less in the secondary chamber $x'$ according to the degree of pressure created in the primary chamber. As the partition $b$ swings downward the air passes around the outer edge thereof between it and the inner periphery of the eccentric cylinder 30 and thence escapes through the exit openings $f$ and 101. The antechamber $i$ serves as a sort of reservoir cushioning device for the air current and operates to steady the action of the indicating mechanism.

I claim as my invention:

1. A wind gage for an automobile comprising an antechamber having a wind inlet at the front exposed to the induced draft of locomotion, a chamber having an air outlet and provided with an air inlet communicating with said antechamber, and a registering mechanism actuated by the flow of air through said chambers.

2. A wind gage for an automobile comprising an antechamber having a wind inlet, a chamber having an air outlet and provided with an air inlet communicating with said antechamber, a registering mechanism actuated by the flow of air through said chambers, and means for regulating said air inlet.

3. A wind gage for an automobile comprising an antechamber having a wind inlet, a chamber having an air outlet and provided with an air inlet communicating with said antechamber, a registering mechanism actuated by the flow of air through said chambers, and automatic means for regulating said air inlet.

4. A wind gage for an automobile comprising an antechamber having a wind inlet, a chamber having an air outlet and provided with two air inlets communicating with said antechamber, a registering mechanism actuated by the flow of air through said chambers, and automatic closing means for one of said air inlets.

5. A wind gage for an automobile having an eccentric chamber having a stationary approximately radial partition extending upward from the bottom to the center thereof said chamber being provided with an air inlet on one side of said partition and with an air outlet on the other side thereof, a movable partition pivoted at the inner end of said stationary partition and adapted to swing downward within the eccentric portion of said chamber, a dial at the back of said chamber, an indicator attached to the arbor of said movable partition, and a counterweight device for said movable partition.

6. A wind gage for an automobile having an eccentric chamber having a stationary approximately radial partition extending upward from the bottom to the center thereof said chamber being provided with an air inlet on one side of said partition and with an air outlet on the other side thereof, a movable partition pivoted at the inner end of said stationary partition and adapted to swing downward within the eccentric portion of said chamber, a dial at the back of said chamber, an indicator attached to the arbor of said movable partition, and an adjustable counterweight device for said movable partition.

7. A wind gage for an automobile having an eccentric chamber provided with an approximately radial partition extending upward from the bottom to near the center thereof, a movable partition pivoted at the inner end of the stationary partition and adapted to swing downward within the eccentric portion of said chamber, said chamber having inlet openings on one side of said partitions and an outlet opening on the other side thereof, an indicator attached to the arbor of said movable partition, a dependent rod attached to the arbor of said movable partition and a closing device carried by said rod and movable over one of said openings on the downward swing of said partition.

In testimony that I claim the foregoing as my invention, I have signed my name in presence of two subscribing witnesses.

JENS JENSEN.

Witnesses:
P. HOFMAN-BANG,
ERNEST BOUTARD.

Copies of this patent may be obtained for five cents each, by addressing the "Commissioner of Patents, Washington, D. C."